US011294411B1

(12) United States Patent
Narula et al.

(10) Patent No.: US 11,294,411 B1
(45) Date of Patent: Apr. 5, 2022

(54) STACKABLE MULTI-PHASE POWER STAGE CONTROLLER WITH CURRENT MATCHING

(71) Applicant: TEXAS INSTRUMENTS INCORPORATED, Dallas, TX (US)

(72) Inventors: Rohit Narula, Bengaluru (IN); Muthusubramanian Venkateswaran, Bengaluru (IN); Preetam Charan Anand Tadeparthy, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/950,239

(22) Filed: Nov. 17, 2020

(51) Int. Cl.
   *G05F 1/575* (2006.01)
   *H02M 3/158* (2006.01)

(52) U.S. Cl.
   CPC .......... *G05F 1/575* (2013.01); *H02M 3/1584* (2013.01); *H02M 3/1586* (2021.05)

(58) Field of Classification Search
   None
   See application file for complete search history.

(56) References Cited

U.S. PATENT DOCUMENTS

| | | | |
|---|---|---|---|
| 7,106,025 B1 | 9/2006 | Yin et al. | |
| 9,077,244 B2* | 7/2015 | Wu | H02M 3/1584 |
| 9,606,559 B2* | 3/2017 | Ozawa | H02M 3/158 |
| 10,200,050 B1* | 2/2019 | Ren | H03L 7/24 |
| 10,250,122 B2* | 4/2019 | Chen | H03K 7/08 |
| 10,749,433 B2* | 8/2020 | Kobayashi | H02M 3/158 |
| 2012/0091977 A1* | 4/2012 | Carroll | H02M 3/1584 323/271 |
| 2013/0140892 A1 | 6/2013 | Simper et al. | |
| 2014/0268928 A1 | 9/2014 | Wei et al. | |
| 2019/0097538 A1 | 3/2019 | Huang | |

OTHER PUBLICATIONS

International Search Report and Written Opinion received for PCT application No. PCT/US2021/059320, dated Feb. 24, 2022, 8 pages.

\* cited by examiner

*Primary Examiner* — Thomas J. Hiltunen
(74) *Attorney, Agent, or Firm* — Valerie M. Davis; Charles A. Brill; Frank D. Cimino

(57) ABSTRACT

A power stage controller includes: a multi-phase pulse control circuit; a current sense circuit; a comparator; an error amplifier; and a mode controller. The mode controller includes a mode controller input and a summation circuit. The summation circuit has a first summation circuit input, a second summation circuit input and a summation circuit output, the first summation circuit input is coupled to the error amplifier output, and the summation circuit output is coupled to the first comparator input. The mode controller is configured to: select one of a main controller mode or a secondary controller mode responsive to a mode control voltage at the mode controller input; bypass the summation circuit responsive to selection of the main controller mode; and enable the summation circuit responsive to selection of the secondary controller mode.

20 Claims, 6 Drawing Sheets

STACKABLE MULTI-PHASE POWER STAGE CONTROLLER WITH CURRENT MATCHING

BACKGROUND

The proliferation of electronic devices and integrated circuit (IC) technology has resulted in the commercialization of IC products. As new electronic devices are developed and IC technology advances, new IC products are commercialized. One example IC product for electronic devices is a power stage controller. An example power stage controller provides multi-phase control signals. As the demand for higher currents in electronic devices (e.g., communication devices and servers) increases, the number of phases needed to support the higher currents increase. Also, as the number of phases supported increases, the pin count of a power stage controller increases and results in a larger package size. Efforts to support higher currents and related phases are ongoing.

SUMMARY

In at least one example, a power stage controller includes a multi-phase pulse control circuit having a control input and multi-phase pulse outputs, each of the multi-phase pulse outputs is adapted to be coupled to a respective switch control input of a respective power stage. The power stage controller also includes a current sense circuit having current sense inputs and a current sense output, each of the current sense inputs is adapted to be coupled to a respective current sense terminal of a respective power stage, and the current sense circuit is configured to provide a combined current sense voltage at the current sense output responsive to current sense voltages at the current sense inputs. The power stage controller also includes a comparator having a first comparator input, a second comparator input, and a comparator output, the first comparator input is configured to receive a feedback voltage, the second comparator input is coupled to the first current sense output, and the comparator output is coupled to the control input. The power stage controller also includes an error amplifier having a first error amplifier input, a second error amplifier input, and an error amplifier output, the error amplifier is configured to provide an error voltage at the error amplifier output responsive to a first voltage at the first error amplifier input and a second voltage at the second error amplifier input. The power stage controller also includes a mode controller having a mode controller input and a summation circuit, the summation circuit having a first summation circuit input, a second summation circuit input and a summation circuit output, the first summation circuit input is coupled to the error amplifier output, the summation circuit output is coupled to the first comparator input. The mode controller is configured to: select one of a main controller mode or a secondary controller mode responsive to a mode control voltage at the mode controller input; bypass the summation circuit responsive to selection of the main controller mode; and enable the summation circuit responsive to selection of the secondary controller mode.

In another example, a controller for a multi-phase converter includes a main controller circuit having a first main controller input, a second main controller input, a current sense output terminal, and an error amplifier output terminal, the first main controller input is adapted to be coupled to an output voltage terminal of the multi-phase converter, and the second main controller input is adapted to be coupled to a reference voltage terminal. The controller also includes a secondary controller circuit having a first secondary controller input and a second secondary controller input, the first secondary controller input is coupled to the current sense output terminal, and the second secondary controller input is coupled to the error amplifier output terminal. The secondary controller circuit includes: a summation circuit having a first summation circuit input, a second summation circuit input and a summation circuit output, the first summation circuit input is coupled to the second secondary controller input. The secondary controller circuit also includes an integrator having a first integrator input, a second integrator input, and an integrator output, the first integrator input is coupled to the first secondary controller input, the second integrator input is configured to receive a combined current sense voltage related to power stages of the multi-phase converter controlled by the secondary controller circuit, and the integrator output is coupled to the second summation circuit input.

In another example, a system includes a multi-phase converter adapted to be coupled to a load. The multi-phase converter has: an output voltage terminal; power stages in parallel, each of the power stages having a current sense output terminal; and a controller coupled to each of the power stages. The controller includes: a main controller circuit coupled to some of the power stages and having a first main controller input, a second main controller input, a current sense output terminal, and an error amplifier output terminal, the first main controller input is coupled to the output voltage terminal, and the second main controller input is adapted to be coupled to the reference voltage terminal; and a secondary controller circuit coupled to the main controller circuit and to others of the power stages and having a first secondary controller input and a second secondary controller input, the first secondary controller input is coupled to the current sense output terminal, and the second secondary controller input coupled to the error amplifier output terminal.

DETAILED DESCRIPTION

Figure 1:
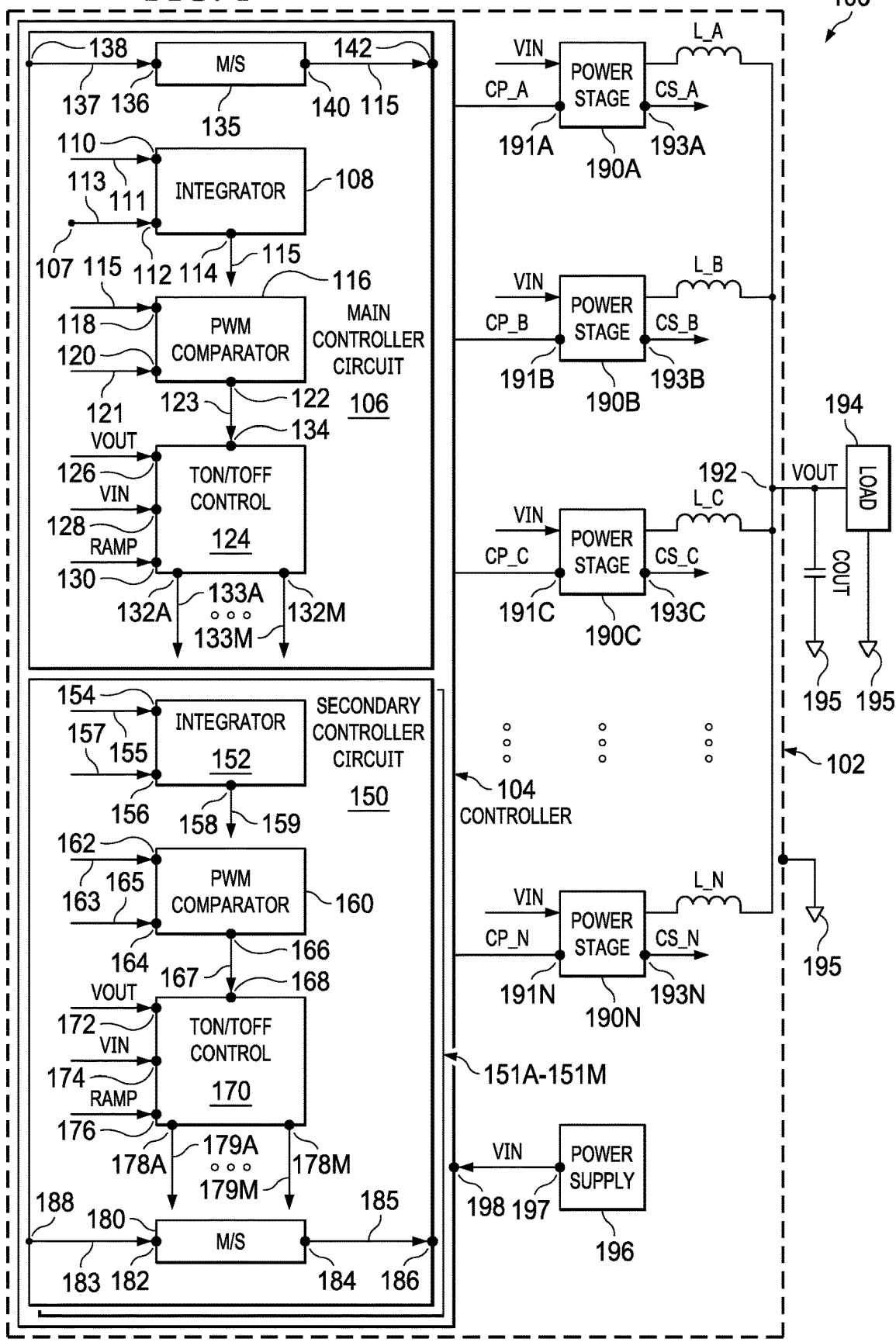
FIG. 1 is a block diagram of a system in accordance with an example embodiment.

In this description, a controller for a multi-phase converter includes a main controller circuit configured to provide multi-phase pulses to a subset of power stages of the multi-phase converter. The multi-phase converter also includes one or more secondary controller circuits coupled to the main controller circuit, where each secondary controller circuit is configured to provide multi-phase pulses to a respective other subset of the power stages of the multi-phase converter. In the described embodiments, the main controller circuit and each secondary controller circuit includes input terminals, output terminals, and/or components to equalize the respective current sense voltages provided to respective control loop comparators of the main controller circuit and each secondary controller circuit. In this manner, even though the respective current sense voltages of the main controller circuit and each secondary controller circuit may be different, the respective control loop comparators will receive the same voltage differential. In some example embodiments, each secondary controller circuit includes an integrator configured to compare the average or total currents of the main controller circuit and the respective secondary controller circuit, resulting in an adjusted off-time (TOFF) for each respective secondary controller circuit and equalized currents for the respective control loops of the main controller circuit and each secondary controller circuit.

Without limitation to other embodiments, in some example embodiments, the main controller circuit and the secondary controller circuits have the same controller topology, where the controller circuit topology is configurable in a main controller mode or a secondary controller mode. Accordingly, the controller for a multi-phase converter includes stackable controller integrated circuits (ICs), where one of the controller ICs is configured as the main controller circuit and other controller ICs are configured as the secondary controller circuits. As used herein, "stackable" refers to the ability to use an increasing amount of controller ICs as desired for a multi-phase converter to support an increasing amount of power stages and current output to a load. In different example embodiments, a multi-phase converter controller includes 1 main controller IC and N secondary controller ICs, where N is an integer equal to 1 or more (e.g., N=1-10 or more).

While the controller topology for stackable controller ICs may vary, a stackable controller IC for power stages of a multi-phase converter may include a multi-phase pulse control circuit having a control input and multi-phase pulse outputs. In this example, each of the multi-phase pulse outputs is adapted to be coupled to a respective switch control input of a respective power stage. The stackable controller IC also includes a current sense circuit having current sense inputs and a current sense output. Also, each of the current sense inputs is adapted to be coupled to a respective current sense terminal of a respective power stage. Also, the current sense circuit is configured to provide a combined current sense voltage at the current sense output responsive to current sense voltages at the current sense inputs. The stackable controller IC also includes a comparator having a first comparator input, a second comparator input, and a comparator output. The first comparator input is configured to receive a feedback voltage, the second comparator voltage is coupled to the first current sense output, and the comparator output is coupled to the control input. The stackable controller IC also includes an error amplifier having a first error amplifier input, a second error amplifier input and an error amplifier output. The error amplifier is configured to provide an error voltage at the error amplifier output responsive to a first voltage at the first error amplifier input and a second voltage at the second error amplifier input. In some example embodiments, the stackable controller IC also includes a mode controller having a mode controller input and a summation circuit. The summation circuit has a first summation circuit input, a second summation circuit input and a summation circuit output, the first summation circuit input is coupled to the error amplifier output. The summation circuit output is coupled to the first comparator input. In operation, the mode controller is configured to: select one of a main controller mode or a secondary controller mode responsive to a mode control voltage at the mode controller input; bypass the summation circuit responsive to selection of the main controller mode; and enable the summation circuit responsive to selection of the secondary controller mode.

In some described embodiments, the control loop of each secondary controller circuit in a controller for a multi-phase converter includes an integrator to equalize the current sense voltages provided to respective control loop comparators of the main controller circuit and the secondary controller circuit. This example embodiment achieves an overall increase in reliability of the multi-phase converter (because all phases will have the same current) without a significant increase in the controller size or bill-of-materials (BOM). Also, the frequency of operation for the main controller circuit and each secondary controller circuit does not change. Also, additional compensation circuitry or external devices are avoided. Other controller topologies are possible with varying complexities, costs, and benefits.

FIG. 1 is a block diagram of a system 100 in accordance with an example embodiment. In the example of FIG. 1, the system 100 is a communication device or server device with a load 194 (e.g., one or more processors and/or other components) powered by a multi-phase converter 102. As shown, the multi-phase converter 102 includes a controller 104 coupled to power stages 190A-190N in parallel, where a power supply 196 provides an input voltage (VIN) at the VIN terminal 197 coupled to the power stages 190A-190N and the controller 104 (e.g., VIN is received at a VIN input terminal 198 of the controller 104 or respective controller circuits). At the output of each of the power stages 190A-190N is a respective inductor (L_A to L_N), where each of L_A to L_N has a respective first side coupled to a respective power stage and a respective second side coupled to an output terminal 192. As shown, the system 100 includes an output capacitor (COUT) in parallel with the load 194 between the output terminal 192 and a ground 195. The ground 195 is also coupled to components of the multi-phase converter 102.

In the example of FIG. 1, the controller 104 includes a main controller circuit 106 and secondary controller circuits 150 and 151A-151M, where the main controller circuit 106 provides pulses (a subset of pulses CP_A to CP_N) to a respective subset of the power stages 190A-190N, and where each of the secondary controller circuits 150 and 151A-151M provides respective pulses (respective subset s of pulses CP_A to CP_N) to other respective subset s of the power stages 190A-190N. The pulses CP_A to CP_N provided to the power stages 190A-109N control respective switches of the power stages 190A-109N.

As shown, the main controller circuit 106 includes a multi-phase pulse control (labeled "TON/TOFF control") circuit 124 having a control input 134 and multi-phase pulse outputs 132A-132M. In operation, the multi-phase pulse control circuit 124 controls the on-time (TON) and the off-time (TOFF) of pulses 133A-133M provided to a respective subset of the power stages 190A-190N. In some example embodiments, each of the multi-phase pulse outputs 132A-132M is adapted to be coupled to a respective subset of switch control inputs 191A-191N of a respective subset of the power stages 190A-190N. In some example embodiments, the control input 134 is a first control input and the multi-phase pulse control circuit 124 also includes a second control input 126, a third control input 128, and a fourth control input 130. In these example embodiments, the second control input 126 is configured to receive VOUT from the output node 192. Also, the third control input 128 is configured to receive VIN from the VIN terminal 197. Also, the fourth control input 130 is configured to receive a ramp voltage (RAMP) from a RAMP source (not shown).

Figure 2:
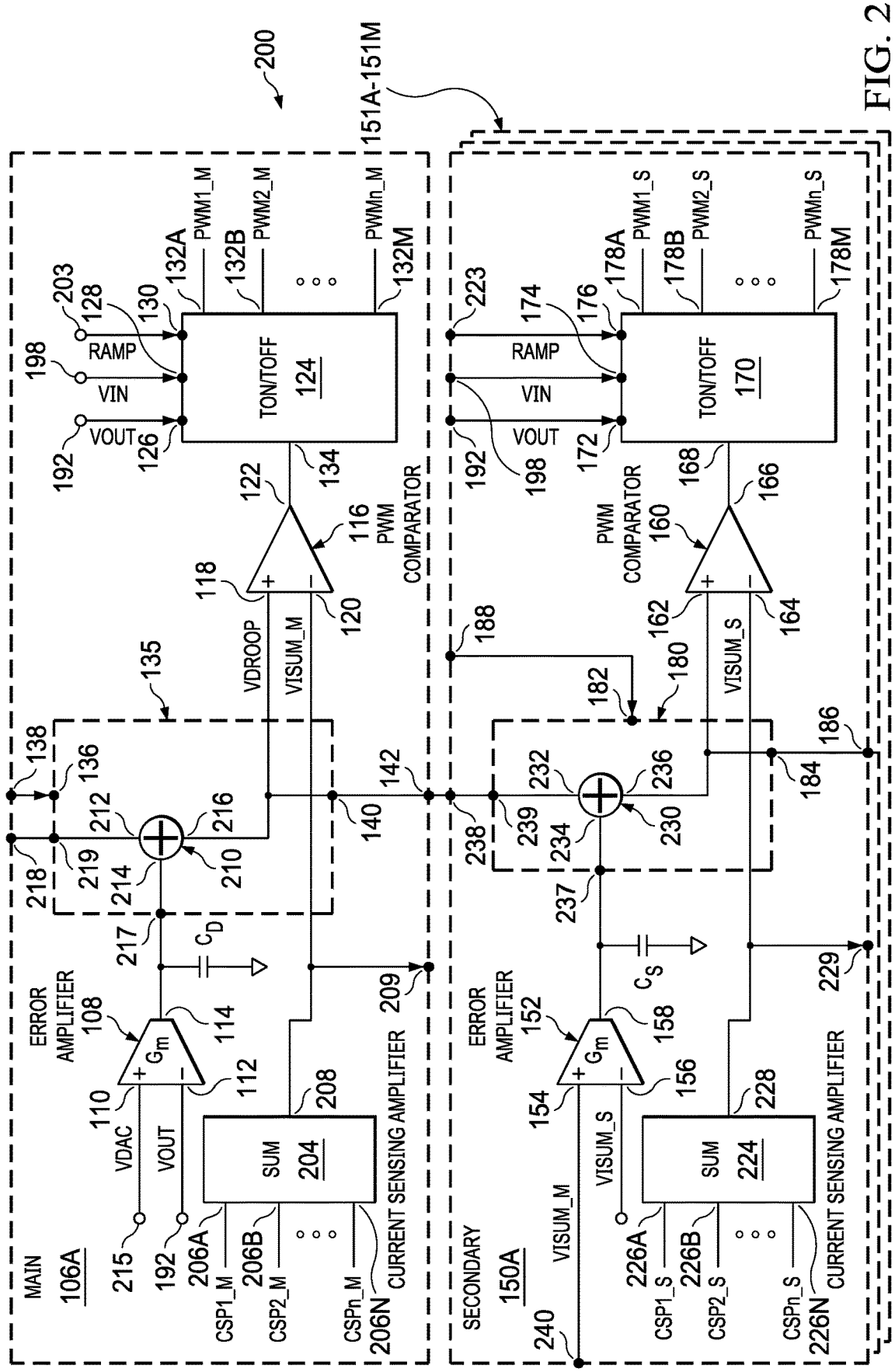
FIG. 2 is a diagram of power stage controller for a multi-phase converter in accordance with an example embodiment.

Referring to the example embodiment of FIG. 2, a main controller circuit, such as the main control circuit 106, also includes a current sense circuit (see e.g., the current sense circuit 204 in FIG. 2) having current sense inputs 206A-206N and a current sense output 208, each of the current sense inputs 206A-206N is adapted to be coupled to a respective subset of current sense terminals 193A-193N of a respective subset of the power stages 190A-190N, and the current sense circuit is configured to provide an average or total current sense voltage (VISUM_M in FIG. 2) at the current sense output 208 responsive to current sense voltages (a subset of CS_A to CS_N in FIG. 1, or CSP1_M to CSPn_M in FIG. 2) at the current sense inputs 206A-206N.

Referring to FIGS. 1 and 2, the main controller circuit 106 also includes a pulse width modulation (PWM) comparator 116 having a first comparator input 118, a second comparator input 120, and a comparator output 122, the first comparator input 118 is configured to receive a feedback voltage (e.g., VDROOP in FIG. 2), the second comparator input is coupled to the current sense output 208, and the comparator output 122 is coupled to the control input 134, where the PWM comparator 116 is configured to provide a voltage 123 at the comparator output 122 responsive to a feedback voltage or error voltage 115 at the first comparator input 118 and a current sense voltage 121 at the second comparator input 120. The main controller circuit 106 also includes an error amplifier or integrator 108 having a first error amplifier or integrator input 110, a second error amplifier or integrator input 112, and an error amplifier or integrator output 114. The error amplifier or integrator 108 is configured to provide the error voltage 115 at the error amplifier or integrator output 114 responsive to a first voltage 111 at the first error amplifier or integrator input 110 and a second voltage 113 at the second error amplifier or integrator input 113. In some examples, the first voltage 111 is the output voltage (VOUT) at the output node 192, and the second voltage 113 is a reference voltage from provided by a reference voltage terminal 107 and related reference voltage source.

The main controller circuit 106 also includes a mode controller (labeled "M/S") 135 having a mode controller input 136 and a summation circuit 210 (see e.g., FIG. 2). The summation circuit 210 has a first summation circuit input 212, a second summation circuit input 214 and a summation circuit output 216. The first summation circuit input 212 is coupled to the error amplifier or integrator output 114, and the summation circuit output 216 is coupled to the first comparator input 118. In operation, the mode controller 135 is configured to select one of a main controller mode or a secondary controller mode responsive to a mode control voltage 137 at the mode controller input 136 (e.g., provided by a mode control pin or terminal 138). The mode control voltage 137 is selectable, for example, by a system designer. The mode controller 135 is also configured to bypass the summation circuit 210 responsive to selection of the main controller mode (resulting in the first comparator input 118 receiving the error voltage 115 from the error amplifier or integrator output 114). The mode controller 135 is also configured to enable the summation circuit 210 responsive to selection of the secondary controller mode (resulting in the first comparator input 118 receiving a voltage from the summation circuit output 216).

In the example embodiment of FIG. 1, when the main controller mode is selected, the mode controller 135 also outputs the error voltage 115 from a mode controller output 140 to an error amplifier output terminal 142. In other example embodiments, the error voltage 115 is provided to the error amplifier output terminal 142 regardless of the mode selected (e.g., the error amplifier output 114 is coupled to the error amplifier output terminal 142 directly or via the mode controller 135). In some example embodiments, the main controller circuit 106 is also configured to output an average or total current sense voltage (e.g., VISUM_M from the current sense circuit 204 in FIG. 2) from a current sense output terminal (e.g., the current sense output terminal 209 in FIG. 2) to each secondary controller circuit 150 and 151A-151M.

In some example embodiments, the secondary controller circuit 150 is configured to receive the error voltage 115 and an average or total current sense voltage (e.g., VISUM_M in FIG. 2) from the main controller circuit 106. In the example of FIG. 1, the secondary controller circuit 150 includes a multi-phase pulse control (labeled "TON/TOFF CONTROL") circuit 170 having a control input 168 and multi-phase pulse outputs 178A-178M. In operation, the multi-phase pulse control circuit 170 controls the TON and TOFF of pulses 179A-179M provided to a respective subset of the power stages 190A-190N. In some example embodiments, each of the multi-phase pulse outputs 179A-179M is adapted to be coupled to a respective subset of the switch control inputs 191A-191N of a respective subset of the power stage 190A-190N. In some example embodiments, the control input 168 is a first control input and the multi-phase pulse control circuit 170 also includes a second control input 172, a third control input 174, and a fourth control input 176. In these example embodiments, the second control input 172 is configured to receive VOUT from the output node 192. Also, the third control input 174 is configured to receive VIN from the VIN terminal 197. Also, the fourth control input 176 is configured to receive RAMP from a RAMP source (not shown).

Referring to the example embodiment of FIG. 2, a secondary controller circuit, such as the secondary control circuit 150, also includes a current sense circuit (see e.g., the current sense circuit 224 in FIG. 2) having current sense inputs 226A-226N and a current sense output 228. Each of the current sense inputs 226A-226N is adapted to be coupled to a respective subset of current sense terminals 193A-193N of a respective subset of the power stages 190A-190N. Also, the current sense circuit 224 is configured to provide a total or average current sense voltage (VISUM_S in FIG. 2) at the current sense output 228 responsive to current sense voltages (a subset of CS_A to CS_N in FIG. 1, or CSP1_S to CSPn_S in FIG. 2) at the current sense inputs 226A-226N.

Referring to FIGS. 1 and 2, the secondary controller circuit 150 also includes a PWM comparator 160 having a first comparator input 162, a second comparator input 164, and a comparator output 166. The first comparator input 162 is configured to receive a feedback voltage, the second comparator input 164 is coupled to the current sense output 228, and the comparator output 166 is coupled to the control input 168. The secondary controller circuit 150 also includes an error amplifier or integrator 152 having a first error amplifier or integrator input 154, a second error amplifier or integrator input 156, and an error amplifier or integrator output 158. The error amplifier or integrator 152 is configured to provide an error voltage 159 at the error amplifier output 158 responsive to a first voltage 155 at the first error amplifier or integrator input 154 and a second voltage 157 at the second error amplifier or integrator input 156. In some examples, the first voltage 155 is an average or total current sense voltage (e.g., VISUM_M in FIG. 2) provided by a current sense circuit (e.g., the current sense circuit 204 in FIG. 2) of the main controller circuit 106, and received by a current sense input terminal (e.g., the current sense input terminal 240) of the secondary controller circuit 150. The second voltage 157 is an average or total current sense voltage (e.g., VISUM_S in FIG. 2) provided by a current sense circuit (e.g., the current sense circuit 224 in FIG. 2) of the secondary controller circuit 150.

The secondary controller circuit 150 also includes a mode controller (labeled "M/S") 180 having a mode controller input 182 and a summation circuit 230 (see e.g., FIG. 2). The summation circuit 230 has a first summation circuit input 232, a second summation circuit input 234 and a summation circuit output 236. The first summation circuit input 232 is coupled to the error amplifier or integrator output 158, and the summation circuit output 236 is coupled to the first comparator input 162. In operation, the mode controller 180 is configured to select one of a main controller mode or a secondary controller mode responsive to a mode control voltage 183 at the mode controller input 182 (e.g., provided by a mode control pin or terminal 188). The mode control voltage 183 is selectable, for example, by a system designer. The mode controller 180 is also configured to bypass the summation circuit 230 responsive to selection of the main controller mode. The mode controller 180 is also configured to enable the summation circuit 230 responsive to selection of the secondary controller mode.

Is some example embodiments, there are additional secondary controller circuits 151A-151M, where each of the secondary controller circuits 151A-151M involves a topology and operations similar to the topology and operations described for the secondary controller circuit 150. In such examples, each of the secondary controller circuits 151A-151M is configured to provide a respective subset of the pulses CP_A to CP_N to a respective subset of the power stages 190A-190N. With the multi-phase converter 102, the number of controller circuits is adjustable to support as many power stages as desired to supply current to the load 194 at a target VOUT.

Without limitation to other options, the main controller circuit 106 and each of the secondary controller circuits 150 and 151A-150M have the same topology, where input terminals (e.g., terminals 218, 138, 240), output terminals (e.g., terminals 209 and 142), and/or components equalize the respective current sense voltages provided to respective control loop comparators (e.g., comparators 116 and 160 in FIG. 1) of the main controller circuit 106 and each of the secondary controller circuits 150 and 151A-151M. In this manner, even though the respective current sense voltages of the main controller circuit and each secondary controller circuit are different, the respective control loop comparators will receive the same voltage differential. As described herein, each of the secondary controller circuits 150 and 151A-151M includes an error amplifier or integrator (e.g., the error amplifier or integrator 152 in FIG. 1) configured to compare the average or total currents of the main controller circuit and the respective secondary controller circuit, resulting in an adjusted TOFF for each secondary controller circuit and equalized currents for the respective control loops of the main controller circuit 106 and each of the secondary controller circuits 150 and 151A-151M.

FIG. 2 is a diagram of a controller 200 for a multi-phase converter (e.g., the multi-phase converter 102 in FIG. 1) in accordance with an example embodiment. As shown, the controller 200 includes a main controller circuit 106A (an example of the main controller circuit 106 in FIG. 1), a secondary controller circuit 150A (an example of the secondary controller circuit 150 in FIG. 1), and the secondary controller circuits 151A-151M. In the example of FIG. 2, the main controller circuit 106A includes many of the same components described for the main controller circuit 106 in FIG. 1, including the error amplifier or integrator 108 and related inputs/outputs, the PWM comparator 116 and related inputs/outputs, the multi-phase pulse control circuit 124 and related inputs/outputs, and the mode controller 134 and related inputs/outputs. Also, the main controller circuit 106A includes the current sense circuit 204 with current sense inputs 206A-206N and the current sense output 208.

In the example of FIG. 2, some additional inputs, outputs, and/or components are represented for the main controller circuit 106A including a current sense output terminal 209 coupled to the current sense output 208. The main controller circuit 106A includes a ramp terminal 203 coupled to the fourth control input 130 of the multi-phase pulse control circuit 124 and configured to provide a ramp voltage. The main controller circuit 106A includes an error voltage input terminal 218 configured to receive an error voltage from another controller circuit (e.g., if the main controller circuit 106A were in the secondary controller mode). The main controller circuit 106A includes the summation circuit 210 with the first summation circuit input 212, the second summation circuit input 214, and the summation circuit output 216, where the summation circuit 210 is part of the mode controller 134. For the mode controller 134 in FIG. 2, the mode controller input 136 is a first mode controller input, where the mode controller 134 also includes a second mode controller input 217 and a third mode controller input 219. As shown, the second mode controller input 217 is coupled to the error amplifier or integrator output 114, and the third mode controller input 219 is coupled to the error voltage input terminal 218. In other examples, the mode controller 134 and the summation circuit 210 are separate, where logic bypasses or enables the summation circuit 210 based on a selected mode identified by the mode controller 134. The main controller circuit 106A includes a reference voltage terminal 215 configured to provide a reference voltage (VDAC) to the first error amplifier or integrator input 110. In operation, the main controller circuit 106A performs the operations described for the main controller circuit 106 in FIG. 1.

In the example of FIG. 2, the secondary controller circuit 150A includes a current sense output terminal 229 coupled to the current sense output 228. Also, the secondary controller circuit 150A includes a ramp terminal 223 coupled to the fourth control input 176 of the multi-phase pulse control circuit 170 and configured to provide a ramp voltage (RAMP). The secondary controller circuit 150A includes an error voltage input terminal 238 configured to receive an error voltage from a main controller circuit (e.g., the main controller circuit 106A in FIG. 2). The secondary controller circuit 150A includes the summation circuit 230 with the first summation circuit input 232, the second summation circuit input 234, and the summation circuit output 236, where the summation circuit 230 is part of the mode controller 180. Also, for the mode controller 180 in FIG. 2, the mode controller input 182 is a first mode controller input, where the mode controller 180 also includes a second mode controller input 237 and a third mode controller input 239.

As shown, the second mode controller input 237 is coupled to the error amplifier or integrator output 158, and the third mode controller input 239 is coupled to the error voltage input terminal 238. In other examples, the mode controller 180 and the summation circuit 230 are separate, where logic bypasses or enables the summation circuit 230 based on a selected mode identified by the mode controller 180. The secondary controller circuit 150A includes current sense input terminal 240 configured to receive an average or total sense current voltage (e.g., VISUM_M in FIG. 2) from the current sense output terminal 209 of the main controller circuit 106A. In operation, the secondary controller circuit 150A performs the operations described for the secondary controller circuit 150 in FIG. 1. The secondary controller circuit 151A-151M in FIG. 2 are similar to the secondary controller circuit 150A and are likewise configured to perform the operations described for the secondary controller circuit 150 in FIG. 1.

Without limitation to other options, the main controller circuit 106A and each of the secondary controller circuits 150A and 151A-150M in FIG. 2 has the same topology, where input terminals (e.g., terminals 218, 138, 215, 240), output terminals (e.g., terminals 209, 142, and 229), and/or other components equalize the respective current sense voltages provided to respective control loop comparators (e.g., comparators 116 and 160 in FIG. 1) of the main controller circuit 106A and each of the secondary controller circuits 150A and 151A-151M. In this manner, even though the respective current sense voltages of the main controller circuit and each secondary controller circuit may be different, the respective control loop comparators will receive the same voltage differential. As described herein, each of the secondary controller circuits 150A and 151A-151M includes an error amplifier or integrator (e.g., the error amplifier or integrator 152 in FIG. 1) configured to compare the average or total currents of the main controller circuit and the respective secondary controller circuit, resulting in an adjusted TOFF for each secondary controller circuit and equalized currents for the respective control loops of the main controller circuit 106A and each of the secondary controller circuits 150A and 151A-151M.

Figure 3:
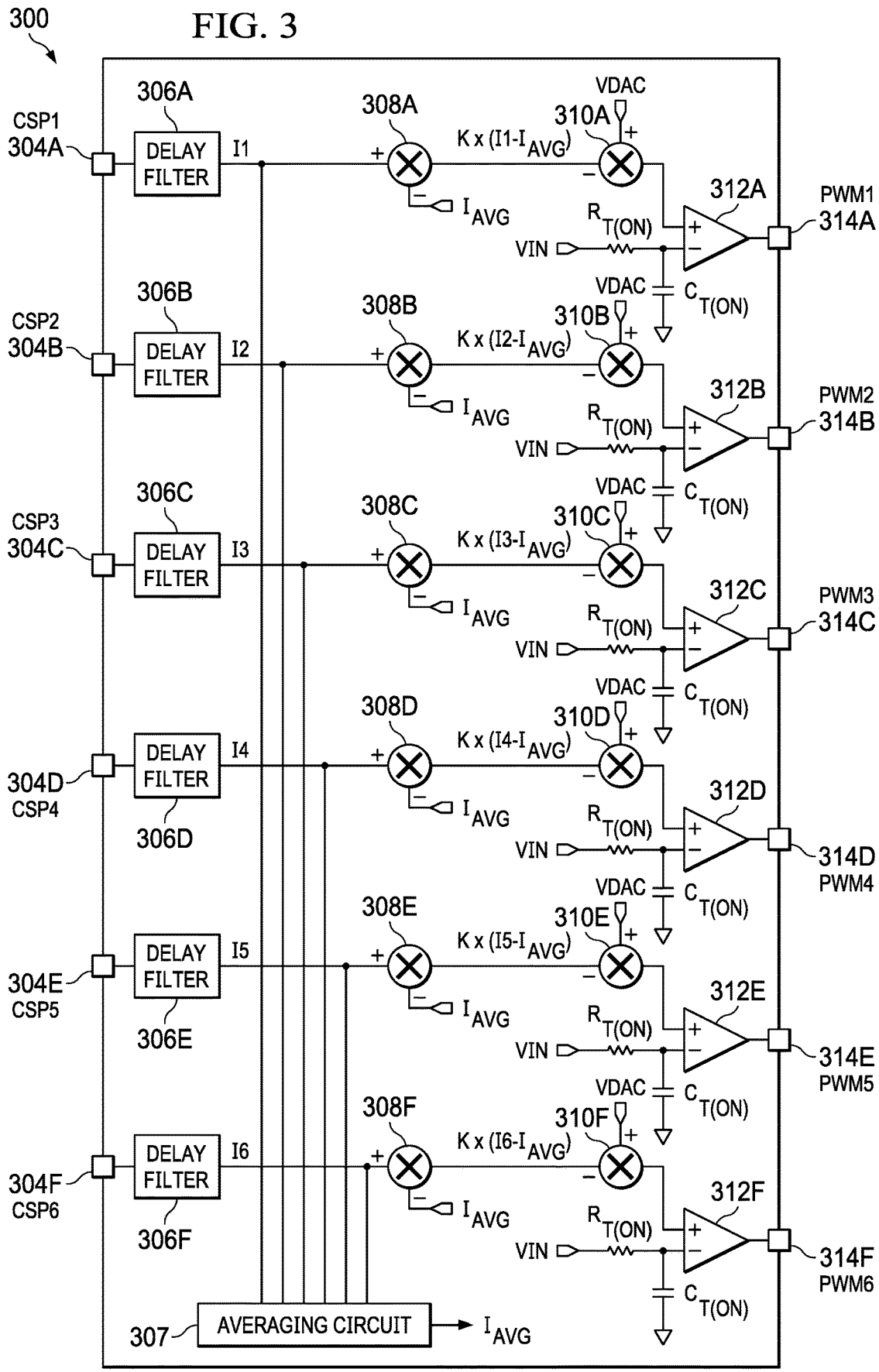
FIG. 3 is a diagram of a current share loop circuitry of a power stage controller for a multi-phase converter in accordance with an example embodiment.

FIG. 3 is a diagram of current share loop circuitry 300, which operates in parallel with a main controller circuit (e.g., the main controller circuit 106 in FIG. 1, or the main controller circuit 106A in FIG. 2) and each secondary controller circuit (e.g., each of the secondary controller circuits 150 and 151A-151M in FIG. 1, or each of the secondary controller circuits 150A and 151A-151M in FIG. 2) of a power stage controller (e.g., the controller 104 in FIG. 1, or the controller 200 in FIG. 2) for a multi-phase converter (e.g., the multi-phase converter 102 in FIG. 1) in accordance with an example embodiment. In operation, the current share loop circuitry 300 equalizes currents across all phases, where the current share loop circuitry 300 has a much lower bandwidth than a current mode control loop (e.g., each of the main controller circuit 106 and each of the secondary controller circuits 150 and 151A-151M includes a current mode control loop). More specifically, the current share loop circuitry 300 compares individual current sense voltages with the average current of all phases and adjusts TON.

As shown, the current share loop circuitry 300 includes current sense inputs 304A-304F configured to receive current sense voltages (e.g., CSP1-CSP6 in FIG. 3) from a respective subset of power stages (e.g., the power stages 190A-190N). The current sense inputs 304A-304F are coupled to respective delay filters 306A-306F (e.g., 5 us delay filters). The outputs of the delay filters 306A-306F are coupled to an averaging circuit 307 as well as respective multipliers 308A-308F. Each of the respective multipliers 308A-308F is configured to multiply the output of a respective one of the delay filters 306A-306F with the average current ($I_{AVG}$) output from the averaging circuit 307. The respective outputs from the multipliers 308A-308F (labeled as K×(I1-$I_{AVG}$) to K×(I6-$I_{AVG}$)) are provided to respective summers 310A-310F to add K×(I1-$I_{AVG}$) to K×(I6-$I_{AVG}$) with a reference voltage (VDAC). The outputs of the respective summers 310A-310F are provided to the non-inverting inputs of respective comparators 312A-312F. The inverting inputs of the respective comparators 312A-312F are coupled to respective reference circuits, each reference circuit having a resistor $R_{T(ON)}$ and a capacitor $C_{T(ON)}$. As shown, a first side of each $R_{T(ON)}$ is coupled to a VIN source or related terminal, and a second side of each $R_{T(ON)}$ is coupled to the inverting input of a respective comparator of the comparators 312A-312F. Also, a first side of each $C_{T(ON)}$ is coupled to the inverting input of a respective comparator of the comparators 312A-312F, and the second side of each $C_{T(ON)}$ is coupled to ground. The outputs of the comparators 312A-312F are coupled to PWM output terminals 314A-314F to provide PWM pulses (PWM1-PWMF6). To summarize, the main controller circuit and each secondary controller circuit operates to control the TOFF of PWM pulses output from a controller (e.g., controller 104 in FIG. 1) to respective subsets of power stages as described herein. In parallel with the TOFF control provided by the main controller circuit and each secondary controller circuit, each current share loop circuitry (e.g., one of the current share loop circuitry 300 in FIG. 3 for the main controller circuit and each secondary controller circuit) controls the TON of PWM pulses output from a controller (e.g., controller 104 in FIG. 1) to respective subset s of power stages as described herein.

Figure 4:
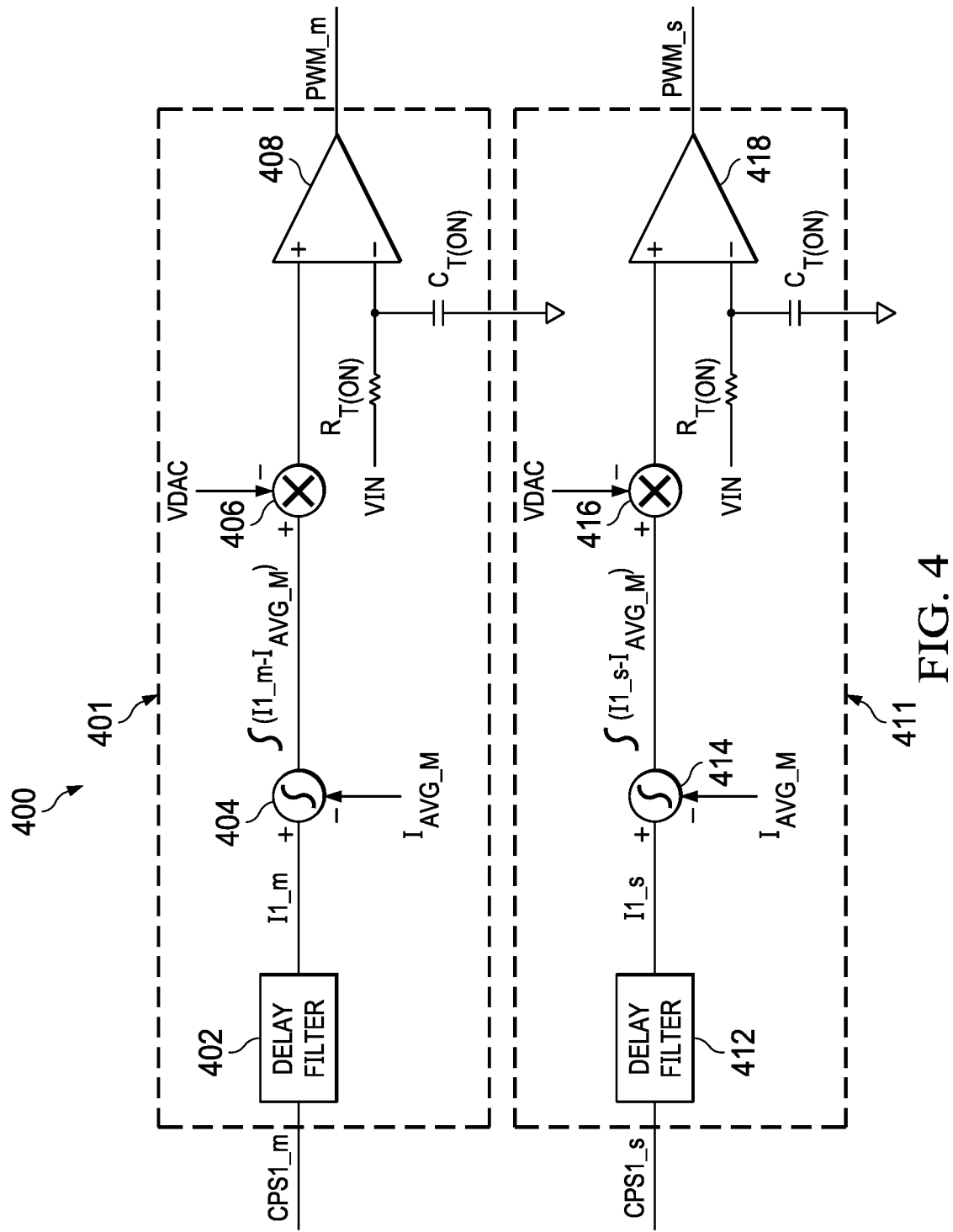
FIG. 4 is a diagram of power stage controller for a multi-phase converter in accordance with an example embodiment.

FIG. 4 is a diagram of power stage controller 400 for a multi-phase converter (e.g., the multi-phase converter 102 in FIG. 1) in accordance with an example embodiment. The power stage controller 400 is an alternative topology relative to the topologies shown in FIGS. 1, 2, and 3. As shown, the power stage controller 400 includes a main controller circuit 401 with a delay filter 402, an integrator 404, a multiplier 406, and a comparator 408. More specifically, the delay filter 402 is configured to receive a current sense signal (CSP1_$m$) and to output a related current sense signal (I1_$m$), which is multiplied by an average current sense signal ($I_{AVG\_M}$) for the main controller circuit 401. The output of the integrator 404 is a function of I1_$m$-$I_{AVG\_M}$ and is provided to the multiplier 406, which is configured to scale the output of the integrator 404 by a reference voltage (VDAC). The output of the multiplier 406 is coupled to the non-inverting input of the comparator 408. Also, the inverting input of the comparator 408 is coupled to reference circuit having a resistor ($R_{T(ON)}$) and a capacitor ($C_{T(ON)}$). As shown, a first side of $R_{T(ON)}$ is coupled to a VIN source or related terminal, and a second side of $R_{T(ON)}$ is coupled to the inverting input of the comparator 408. Also, a first side of $C_{T(ON)}$ is coupled to the inverting input of the comparator 408, and the second side of $C_{T(ON)}$ is coupled to ground. The output of the comparator 408 is a PWM pulse (PWM_m). In FIG. 4, the circuitry (e.g., the delay filter 402, the integrator 404, the multiplier 406, and the comparator 408) of the main controller circuit 401 is repeated for each phase managed by the main controller circuit 401.

Also, the secondary controller circuit 411 includes a delay filter 412, an integrator 414, a multiplier 416, and a comparator 418. More specifically, the delay filter 412 is configured to receive a current sense signal (CSP1_s) and to output a related current sense signal (I1_s), which is multiplied by an average current sense signal ($I_{AVG}$_M) for the secondary controller circuit 411. The output of the integrator 414 is a function of I1_s–$I_{AVG\_M}$ and is provided to the multiplier 416, which scales the output of the integrator 414 by a reference voltage (VDAC). The output of the multiplier 416 is coupled to the non-inverting input of the comparator 418. Also, the inverting input of the comparator 418 is coupled to reference circuit having a $R_{T(ON)}$ and $C_{T(ON)}$. As shown, a first side of $R_{T(ON)}$ is coupled to a VIN source or related terminal, and a second side of $R_{T(ON)}$ is coupled to the inverting input of the comparator 418. Also, a first side of $C_{T(ON)}$ is coupled to the inverting input of the comparator 408, and the second side of $C_{T(ON)}$ is coupled to ground. The output of the comparator 418 is a PWM pulse (PWM_s). In FIG. 4, the circuitry (e.g., the delay filter 412, the integrator 414, the multiplier 416, and the comparator 418) of the secondary controller circuit 411 is repeated for each phase managed by each secondary controller circuit 411.

With the topology of the power stage controller 400, the secondary controller circuit 411 can be repeated to support additional phases. Also, a current share loop that includes an integrator and/or high gain in its path and the average current of the main controller circuit can be shared among all controller circuits or ICs. With this topology, the loop will have two poles at origin because of the inductor (e.g., one of L_A to L_N) and the integrator. Accordingly, additional loop compensation will be needed. Also, the described power stage controller 400 will change the TON of ICs, which will in turn change the frequency of operation between main and secondary controller circuits. To solve this issue, another frequency control loop would be needed.

Another option involves using averaging circuitry with all the phase currents of the main and secondary controller circuits as inputs. The averaged output may then be provided to the current share loop of both the main controller circuit and each secondary controller circuit. With this other option, the bill-of-materials (BOM)/cost increases. Also, TON will be changed and with limited gain the error may not be eliminated as much as desired.

Figure 5:
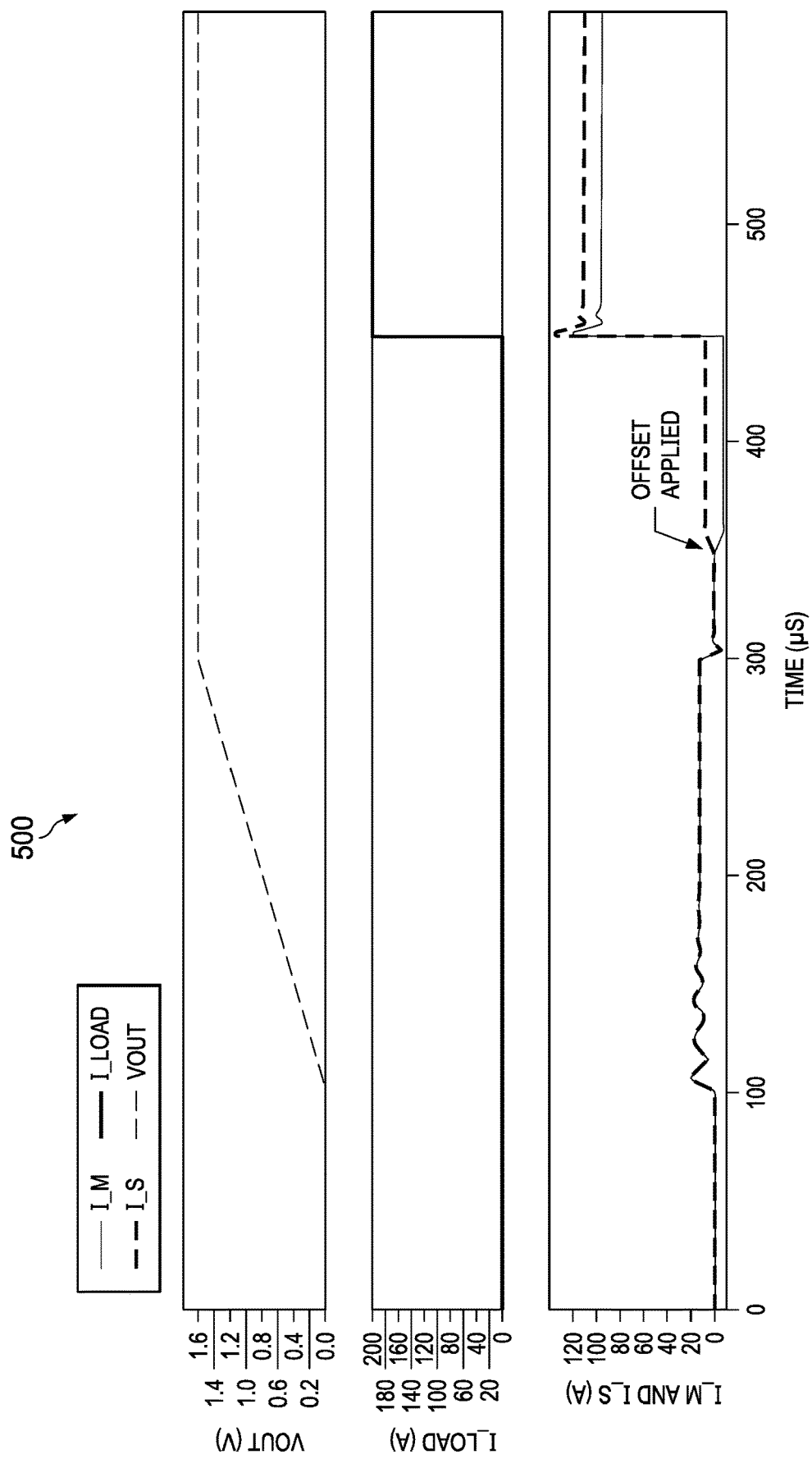
FIG. 5 is a timing diagram showing waveforms of a multi-phase converter without the described power stage controller.

FIG. 5 is a diagram of a timing diagram 500 showing waveforms of a multi-phase converter without the described power stage controller. In the timing diagram 500, waveforms for VOUT, a load current (I_LOAD), a main controller circuit current (I_M) and a secondary controller circuit current (I_S) are represented. As shown, after VOUT reaches a target level, I_M and I_S become offset from each other, which reduces the stability/efficiency of a multi-phase converter (e.g., the multi-phase converter 102 of FIG. 1) in transient conditions, such as when I_LOAD transitions from a low to high.

For the timing diagram 500 of FIG. 5, the controller topology of FIG. 2 is assumed, where the error amplifier 152 is omitted or disconnected and an offset is applied at around 350 μs between control loops of the main controller circuit 106A and secondary controller circuits 150A and 151A-151M. The offset results in I_M and I_S becoming different from each other. The difference in I_M and I_S will result in phases of a main controller circuit and a secondary controller circuit having different currents, which creates thermal imbalance between phases of a main controller circuit and a secondary controller circuit. The difference in I_M and I_S also reduces the reliability for phases taking higher current due to power stage and/or inductor durability being reduced. The difference in I_M and I_S also reduces efficiency at lower loads as current flows between power stages related to a main controller circuit and each secondary controller circuit, resulting in heating losses (e.g., I^2*Ron losses).

Figure 6:
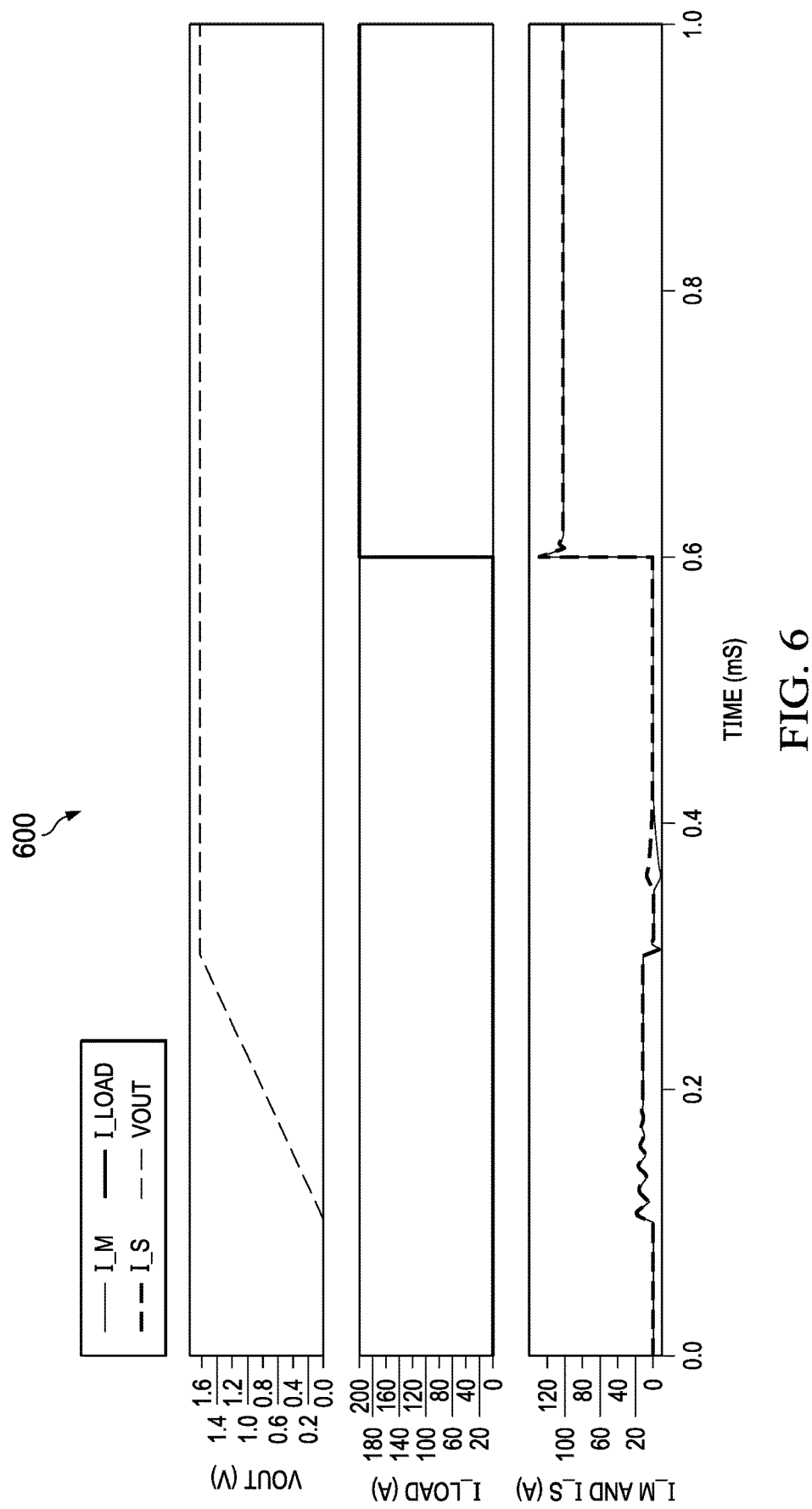
FIG. 6 is a timing diagram showing waveforms of a multi-phase converter with the described power stage controller.

FIG. 6 is a diagram of timing diagram 600 showing waveforms of a multi-phase converter with the described power stage controller (e.g., the controller 104 in FIG. 1, or the controller 200 in FIG. 2). In the timing diagram 600, waveforms for VOUT, I_LOAD, a I_M and I_S are represented. As shown, after VOUT reaches a target level, I_M and I_S are equal most of the time, which improves the stability/efficiency of a multi-phase converter (e.g., the multi-phase converter 102 of FIG. 1) in transient conditions, such as when I_LOAD transitions from a low to high.

For the timing diagram 600 of FIG. 6, the controller topology of FIG. 2 is assumed, where the error amplifier 152 is connected and an offset is applied at around 350 μs between control loops of the main controller circuit 106A and secondary controller circuits 150A and 151A-151M. Initially, I_M and I_S start deviating from each other after the offset is applied, but the operations of the error amplifier 152 bring I_M and I_S back to the same value. This ensures that phases of main controller circuit 106A and each of the secondary controller circuits 150A and 151A-151M take same current.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A power stage controller, comprising:
a multi-phase pulse control circuit having a control input and multi-phase pulse outputs, each of the multi-phase pulse outputs adapted to be coupled to a respective switch control input of a respective power stage;
a current sense circuit having current sense inputs and a current sense output, each of the current sense inputs adapted to be coupled to a respective current sense terminal of a respective power stage, and the current sense circuit configured to provide a combined current sense voltage at the current sense output responsive to current sense voltages at the current sense inputs;
a comparator having a first comparator input, a second comparator input, and a comparator output, the comparator configured to receive a feedback voltage at the first comparator input, the second comparator input coupled to the current sense output, and the comparator output coupled to the control input;
an error amplifier having a first error amplifier input, a second error amplifier input, and an error amplifier output, the error amplifier configured to provide an error voltage at the error amplifier output responsive to a first voltage at the first error amplifier input and a second voltage at the second error amplifier input; and
a mode controller having a mode controller input and a summation circuit, the summation circuit having a first summation circuit input, a second summation circuit input, and a summation circuit output, the first summation circuit input coupled to the error amplifier output, the summation circuit output coupled to the first comparator input, and the mode controller configured to:
select one of a main controller mode or a secondary controller mode responsive to a mode control voltage at the mode controller input;
bypass the summation circuit responsive to selection of the main controller mode; and
enable the summation circuit responsive to selection of the secondary controller mode.

2. The power stage controller of claim 1, wherein, in the main controller mode, the first error amplifier input is adapted to be coupled to an output voltage terminal, the second error amplifier input is adapted to be coupled to a reference voltage, and the first comparator input configured to receive the error voltage as the feedback voltage.

3. The power stage controller of claim 2, further comprising an error amplifier output terminal coupled the error amplifier output and configured to provide the error voltage to another power stage controller.

4. The power stage controller of claim 1, wherein, in the secondary controller mode, the first error amplifier input is adapted to be coupled to a current sense output terminal of another power stage controller, the second error amplifier input is adapted to be coupled to the current sense output, and the first comparator input is configured to receive a summed voltage from the summation circuit output responsive to: an error voltage at the first summation circuit input provided by another power stage controller in the main controller mode; and the error voltage at the error amplifier output.

5. The power stage controller of claim 1, further comprising a current sense output terminal coupled to the current sense output and configured to provide the combined current sense voltage at the current sense output to another power stage controller.

6. The power stage controller of claim 1, wherein the control input is a first control input, the multi-phase pulse control circuit having a second control input, a third control input and a fourth control input, the second control input coupled to an output voltage terminal, the third control input coupled to an input voltage terminal, the fourth control input coupled to a ramp terminal, and the multi-phase pulse control circuit configured to control the multi-phase pulse outputs responsive to a voltage at the first control input, an output voltage at the second control input, an input voltage at the third control input, and a ramp voltage at the fourth control input.

7. The power stage controller of claim 1, wherein, in the secondary controller mode, the error amplifier is configured to operate as an integrator in an off-time control loop to equalize a current of another power stage controller configured in a main controller mode with a current of the power stage controller.

8. A controller for a multi-phase converter, comprising:
a main controller circuit having a first main controller input, a second main controller input, a current sense output terminal, and an error amplifier output terminal, the first main controller input adapted to be coupled to an output voltage terminal of the multi-phase converter, the second main controller input adapted to be coupled to a reference voltage terminal; and
a secondary controller circuit having a first secondary controller input and a second secondary controller input, the first secondary controller input coupled to the current sense output terminal, the second secondary controller input coupled to the error amplifier output terminal, the secondary controller circuit including:
a summation circuit having a first summation circuit input, a second summation circuit input and a summation circuit output, the first summation circuit input coupled to the second secondary controller input; and
an integrator having a first integrator input, a second integrator input, and an integrator output, the first integrator input coupled to the first secondary controller input, the integrator configured to receive at the second integrator input a combined current sense voltage for power stages of the multi-phase converter controlled by the secondary controller circuit, and the integrator output coupled to the second summation circuit input.

9. The controller of claim 8, wherein the combined current sense voltage is a first combined current sense voltage, and the main controller circuit includes:
a multi-phase pulse control circuit having a control input and multi-phase pulse outputs, each of the multi-phase pulse outputs adapted to be coupled to a respective switch control input of a respective power stage of the multi-phase converter;
a current sense circuit having current sense inputs and a current sense output, each of the current sense inputs adapted to be coupled to a respective current sense output terminal of a respective power stage of the multi-phase converter, and the current sense circuit configured to provide a second combined current sense voltage at the current sense output responsive to current sense voltages at the current sense inputs;
a comparator having a first comparator input, a second comparator input, and a comparator output, the comparator configured to receive a feedback voltage at the first comparator input, the second comparator input coupled to the current sense output, and the comparator output coupled to the control input;
an error amplifier having a first error amplifier input, a second error amplifier input, and an error amplifier output, the first error amplifier input coupled to the first main controller input, the second error amplifier input coupled to the second main controller input, and the error amplifier configured to provide an error voltage at the error amplifier output responsive to an output voltage at the first error amplifier input and a reference voltage at the second error amplifier input.

10. The controller of claim 8, wherein the summation circuit is a first summation circuit, and the main controller circuit includes:
a second summation circuit; and
a mode controller with a mode controller input and configured to:
select one of a main controller mode or a secondary controller mode responsive to a voltage at the mode controller input;
bypass the second summation circuit responsive to selection of the main controller mode; and
enable the second summation circuit responsive to selection of the secondary controller mode.

11. The controller of claim 8, wherein the secondary controller circuit includes:
a multi-phase pulse control circuit having a control input and multi-phase pulse outputs, each of the multi-phase pulse outputs adapted to be coupled to a respective switch control input of a respective power stage of the multi-phase converter;

a current sense circuit having current sense inputs and a current sense output, each of the current sense inputs adapted to be coupled to a respective current sense output terminal of a respective power stage of the multi-phase converter, and the current sense circuit configured to provide a combined current sense voltage at the current sense output responsive to current sense voltages at the current sense inputs; and a comparator having a first comparator input, a second comparator input, and a comparator output, the comparator configured to receive a feedback voltage at the first comparator input, the second comparator input coupled to the current sense output, and the comparator output coupled to the control input.

12. The controller of claim 8, wherein the main controller circuit is part of a first integrated circuit (IC) and the secondary controller circuit is part of a second IC.

13. The controller of claim 8, further comprising secondary controller circuits including the secondary controller circuit, each of the secondary controller circuits having a respective first secondary controller input and a respective second secondary controller input, each respective first secondary controller input coupled to the current sense output terminal, and each respective second secondary controller input coupled to the error amplifier output terminal.

14. The controller of claim 13, wherein the main controller circuit is part of a first integrated circuit (IC) and each secondary controller circuit is part of one or more other ICs.

15. An apparatus for controlling a multi-phase converter, the apparatus comprising:
a first controller circuit including:
a first error amplifier having a feedback input, a reference input, and a first error amplifier output;
a first current sense circuit having a first current sense output, the first current sense circuit configured to generate a first current sense signal, at the first current sense output, which represents a first combined current;
a first comparator having a first comparator input, a second comparator input, and a first comparator output, the first comparator input coupled to the first error amplifier output, and the second comparator input coupled to the first current sense output; and
a first pulse generation circuit coupled to the first comparator output; and
a second controller circuit including:
a second current sense circuit having a second current sense output, the second current sense circuit configured to generate a second current sense signal, at the second current sense output, which represents a second combined current;
a second error amplifier having a first error amplifier input, a second error amplifier input, and a second error amplifier output, the first error amplifier input coupled to the first current sense output, and the second error amplifier input coupled to the second current sense output;
a summation circuit having a first summation input, a second summation input, and a summation output, the first summation input coupled to the first error amplifier output, and the second summation input coupled to the second error amplifier output;
a second comparator having a third comparator input, a fourth comparator input, and a second comparator output, the third comparator input coupled to the summation output, and the fourth comparator input coupled to the second current sense output; and
a second pulse generation circuit coupled to the second comparator output, the second pulse generation circuit having a pulse generation output, the second pulse generation circuit configured to adjust a pulse for the multi-phase converter at the pulse generation output responsive to a difference between the first and second combined currents.

16. The apparatus of claim 15, the first current sense circuit has first current sense inputs, the second current sense circuit has second current sense inputs, and the apparatus further comprising:
a multi-phase converter having a converter output coupled to the feedback input, a converter input coupled to the pulse generation output, and the multi-phase converter including power stages coupled in parallel, each power stage having a respective current sense output, some of the current sense outputs coupled to the first current sense inputs, and others of the current sense outputs coupled to the second current sense inputs.

17. The apparatus of claim 16, further comprising a load coupled to the converter output.

18. The apparatus of claim 15, wherein one or both of the first error amplifier or the second error amplifier includes a respective integrator.

19. The apparatus of claim 15, wherein the first controller circuit is part of a first integrated circuit and the second controller circuit is part of a second integrated circuit.

20. An apparatus for controlling parallel power stages of a multi-phase converter, the apparatus comprising:
a first controller circuit including:
a first error amplifier configured to generate a first error signal responsive to a difference between a feedback signal from the multi-phase converter and a reference signal; and
a first current sense circuit configured to generate a first current sense output signal that represents a first combined current at outputs of a first plurality of the parallel power stages, in which the first controller circuit is configured to provide first pulse width modulation signals for the first plurality of the parallel power stages responsive to a difference between the first error signal and the first current sense output signal;
a second controller circuit including:
a second current sense circuit configured to generate a second current sense output signal that represents a second combined current at outputs of a second plurality of the parallel power stages;
a second error amplifier configured to generate a second error signal responsive to a difference between the first and second combined currents; and
a summation circuit configured to generate a summation signal responsive to the first and second error signals, in which the second controller circuit is configured to provide second pulse width modulation signals for the second plurality of the parallel power stages responsive to a difference between the summation signal and the second current sense output signal.

* * * * *